3,677,693
METHOD OF MILLING AND RESIN TREATING KERATINOUS FIBERS
Brian Robinson, Menston, near Ilkley, and Stephen Harvey Fillingham, Shipley, England, assignors to I.W.S. Nominee Company Limited, London, England, and Ciba Limited, Basel, Switzerland
No Drawing. Filed Nov. 16, 1970, Ser. No. 90,106
Claims priority, application Great Britain, Nov. 18, 1969, 56,474/69
Int. Cl. D06m 3/02
U.S. Cl. 8—127.5    14 Claims

ABSTRACT OF THE DISCLOSURE

The invention relates to the finishing of textile fabrics consisting wholly or partially of keratinous fibres such as wool. The fabric is milled and simultaneously treated with a resin imparting shrink-resistance to it by agitating it in an organic liquid containing the dissolved resin and emulsified water, separating excess liquor from the fabric and curing the resin remaining on the fabric. The resins are preferably such as will cross-link in the reactive centres on the fibres, with a co-reactant or with itself, and especially polythiol resins containing at least two thiol groups per molecule, and cross-linking catalysts may be added to the milling liquor. The process is particularly useful for knitted fabrics and garments, although it is also applicable to woven fabrics.

---

The present invention relates to a method of milling textile fabrics, including garments, containing keratinous fibres, and simultaneously treating them with a resin imparting shrink-resistance. It is particularly useful for knitted goods but is also of value for woven goods which require a milled finish.

The process of milling and making shrink-resistant fabrics is normally a two-stage process. The milling stage, which enhances the appearance and handle of the goods, may be carried out by a number of methods, a recent example of which is the so-called "solvent-milling" method in which the goods are agitated, e.g. by tumbling, in an emulsion of water and an organic solvent. Imparting shrink-resistance may be carried out by a number of different methods, the more important of which are the resin treatment methods, and the application of resin to the fabric has to follow the milling stage because milling cannot effectively be carried out on a fabric already treated to make it shrink-resistant.

According to the present invention a process for milling a textile fabric, consisting wholly or partially of keratinous fibres and simultaneously treating it with a resin imparting shrink-resistance thereto comprises (a) agitating the fabric in a milling liquor which is an organic solvent containing (i) a resin which imparts shrink-resistance dissolved therein
(ii) water emulsified therein, (b) draining excess liquor from the fabric, and
(c) curing the resin constituent of the liquor remaining on the fabric.

The degree of milling depends on the extent of the agitation applied to the fabric and the amount of water present. Generally, water concentrations in the range of 2 to 30% of the dry weight of the fabrics (a ratio of 1:50 to 1:3) are required. By "dry weight" is meant the weight of wool in equilibrium with the moisture of its atmosphere. It is usually convenient to have present a surface active agent which will facilitate the milling process and which will also assist in the production and stabilisation of the emulsion formed by the water and organic solvent. Cationic, nonionic, and anionic surface active agents may be used but it is found that there is less interference in obtaining a shrink-resist finish when cationic surface active agents are used. The latter type also have the advantage of reducing electrostatic problems and of leaving the goods with a soft handle. Commercially available surface active agents which are suitable for the present process are known as "milling aids" or "dry-cleaning soaps." The amount of surface active agent present in the emulsion may vary between wide limits but generally satisfactory results are obtained if the amount used lies in the range 1 to 30 grams per litre of emulsion, preferably in the range 2 to 20 grams per litre. The amount of surface active agent is preferably from 1 gram per 10 ml. water to 10 gram per ml. water, and usually about 1 gram per 3 ml. water.

As mentioned above, the degree of milling action depends to a large extent on the agitational forces applied to the fabric and these forces may be applied by any convenient piece of textile machinery which has a container provided with means for agitating a fabric therein. Ideally suited for this purpose is the conventional dry-cleaning machine where the fabric is tumbled in a rotating drum and, in the process according to the invention, the emulsion may be formed in the drum either before or after the fabric is inserted and subjected to the tumbling action. The ratio (w./v.) of fabric to solvent is conveniently from 1:70 to 1:6, but most usually about 1:10 (i.e. 100 grams:1 litre).

The organic solvent employed may be any of those which are harmless to keratinous fibres, e.g. white spirit, and is preferably one which is used in the dry-cleaning industry: these are usually liquid halogenated hydrocarbons, particularly chlorinated and chlorinated/fluorinated low molecular weight solvents containing 1 to 4 carbon atoms, e.g. perchloroethylene, trichloroethylene, carbon tetrachloride, 1,1,2 - trichloro - 1,2,2-trifluoroethane and 1,1,1-trichloroethane.

The solvent-soluble resin may be any resin which imparts to the fabric a shrink-resistant finish and which has no reaction with water. There are a number of resins which are used to impart shrink-resistant properties and which contain functional groups capable of reacting with water under the conditions used, e.g. those containing acid chlorides; resins of this type cannot be used in the process of the present invention. Polyisocyanates can be used if they are blocked or if they react sufficiently slowly with water. It is preferable that, as well as being soluble in the organic solvent, the resins should be insoluble in water. It is believed that the resin should be capable of being cross-linked with itself, with reactive centres on the keratinous fibres, or with them both. The resin may also be cross-linked with another substance ("a coreactant") on the keratinous fibres.

Examples of suitable resins are the solvent-soluble acrylics, polybutadienes, carboxylated polybutadienes, silicones, polyepoxides and polythiols.

The acrylic resins are polymers and co-polymers of acrylic acid, acrylamide, acrylonitrile and alkyl and hydroxyalkyl esters of acrylic acid with $C_1$ to $C_8$ aliphatic alcohols; also the methacrylic analogues of these. Those which are more suitable are those which are soft, i.e. have a glass transition temperature of below 0° C. and are cross-linkable.

The preferred polybutadienes are those having a molecular weight in the range 2,500 to 50,000 and may contain methyl or chloromethyl substituents.

The carboxylated polybutadienes which may be used in the invention can be prepared by reacting such polybutadienes with mercaptocarboxylic acids. The preferred silicones are polydimethyl siloxanes having an average molecular weight of at least 1,000.

Polyepoxides which may be used include polyglycidyl ethers of polyhydric phenols having an epoxide content of at least 1 equiv./kg.

The preferred polythiols are those having, per molecule, two or more —SH groups directly attached to aliphatic carbon atoms. Those which have been found to be particularly useful are those having a polyoxyalkylene backbone to which are attached the thiol, i.e. mercaptan, groups. Alternatively, the backbone may be a polyester structure or a structure containing alkyleneoxy and polysulphide units. Excellent results have been obtained with the class of polythiol resins having at least two thiol groups per molecule and containing:

(a) a radical of a polyhydric alcohol,
(b) bound to this radical, at least two poly(oxyalkylene) chains, and
(c) bound through oxygen atoms to carbon in the said poly(oxyalkylene) chains, at least two residues selected from the group consisting of an acyl radical of a thiol-containing aliphatic carboxylic acid or a residue, after removal of a hydroxyl group, of a thiol-containing aliphatic alcohol.

The most important resins of this class may be defined as those prepared by the reaction of a polyhydric alcohol with an alkylene oxide followed by esterification of the terminal hydroxy groups with a mercaptocarboxylic acid, preferably thioglycollic acid. An example of such a resin is "Thiol Resin A" as described in Example 1.

The preferred amount of the resin applied to the fabric lies in the range 0.5 to 15% by weight (1:200 to 1:7 ratio), preferably in the range 1 to 5% by weight, of dry fabric.

The milling liquor containing the requisite amount of water emulsified therein is a cloudy solution, and when the fabric is agitated in this solution it gradually clarifies as the water passes from the emulsion on to the goods. Such a change in the appearance of the solution is a convenient indication of when the point of complete water retention by the fabric is reached, and at this point the desired amount of milling in the presence of the liquor has, in most cases, been carried out. The agitation period is usually from 1 to 25 minutes.

After agitating the fabric in the presence of the milling liquor, excess liquor is drained from the fabric, preferably to leave 10 to 500% by weight of liquor thereon. Draining may be effected by simply allowing excess liquor to run from the container holding the milling liquor but when a dry-cleaning machine is used excess liquor may be centrifuged from the fabric by using the hydro-extract cycle. When draining is completed it is preferable to maintain the wet fabric in a state of agitation for a further period to complete substantially the milling of the fabric; such a further period may last from about 1 to 10 minutes. This period of agitating the wet fabric is normally required for the majority of fabrics. It is to be noted that milling of the fabric continues whilst water is present and thus the degree of milling achieved is affected by all steps which involve agitation of the fabric in the presence of water. Residual solvents are then removed, usually in the presence of heat.

The fabric may then be stored to allow the resin constituent of the liquor to cure and thus obtain the maximum shrink-resistant effect. The precise curing conditions selected for any particular resin, of course, must depend on its chemical and physical properties but generally speaking mild heating will be advantageous for all resins, for example heating to a temperature in the range 25° to 120° or up to 150° C. The curing of the resin may also be accelerated by using an appropriate catalyst and/or coreactant which may be incorporated in the solvent or the water of the milling liquor or may be applied to the fabric before or after treatment commences.

The acrylic resins may be cross-linked by reaction with aminoplasts, epoxide resin or phenoplasts; the reaction may be accelerated by selection of an appropriate catalyst. For example, strong acids such as toluene-p-sulphonic acid may be used to catalyse the reaction of hydroxyl-containing acrylic resins with aminoplasts. Some types of acrylic resin, e.g. those based on N-(hydroxymethyl)acrylamide are self-linkable and the curing reaction can be accelerated by strong acids.

Catalysts for the curing of polybutadienes and carboxylated polybutadienes include siccatives such as cobalt octoate, iron naphthenate or manganese naphthenate.

The cure of the silicones may be accelerated by using siccatives such as those listed above, organometallic compounds, e.g. dibutyltin dilaurate or free radical catalysts such as peroxides or hydroperoxides, e.g. dibenzoyl peroxides.

Epoxide resins may be cross-linked by reaction with co-reactants such as polyamines and poly(aminoamides) or by homopolymerisation by using tertiary amines, or Lewis acids such as as $BCl_3$.

In the case of the polythiol resins defined above these may be catalysed by organic and inorganic bases, siccatives, free-radical catalysts, and oxidative curing agents. As organic bases there may be used primary or secondary amines such as the lower alkanolamines, e.g. mono- and di-ethanolamine (MEA and DEA), and polyamines, e.g. ethylendiamine, diethylenetriamine (DETA), triethylenetetramine, tetraethylenepentamine, hexamethylenediamine (HMD), and polyethyleneimine (PEI). As inorganic bases there may be used the water-soluble oxides and hydroxides, e.g. sodium hydroxide, or ammonia, sodium carbonate, bicarbonate or sodium tetraborate. All these catalysts are water-soluble and can be included in the milling water. Solvent-soluble catalysts can also be used and are applied with the resin in the solvent. Examples include siccatives such as calcium, copper, iron, lead, cerium, and cobalt naphthenates, and free-radical catalysts, for example peroxides and hydroperoxides such as cumene hydroperoxide, tert-butyl hydroperoxide, dicumyl peroxide, dilauryl peroxide, methyl ethyl ketone peroxide, di-isopropyl peroxydicarbonate and bis(4-chlorobenzoyl) peroxide. Other types of catalysts include sulphur, and sulphur-containing organic compounds in which the sulphur is not exclusively present in mercaptan groups, namely, mercaptobenzothiazoles or derivatives thereof, dithiocarbamates, thiuram sulphides, thioureas, dialkyl, dicycloalkyl, or diaralkyl disulphides, alkyl xanthogen disulphides, and alkyl xanthates. Yet other catalysts are salts of a heavy metal with an acid having an acid strength ($-\log pK$) below 5, or chelates of a heavy metal, including chelates which are also salts.

By "heavy metal" is meant one classified as "heavy" in Lange's Handbook of Chemistry, revised 10th edition, McGraw-Hill Book Co., at pp. 60–61, that is, a metal of Group I–B, II–B, III–B, IV–B, V–B, VI–B, VII–B, or VIII, a metal of Group III–A having an atomic number of at least 13, a metal of Group IV–A having an atomic number of at least 32, or a metal of Group V–A having an atomic number of at least 51. Preferably the metal is a member of Group I–B, II–B, IV–B, V–B, VI–B, VII–B, or VIII, particularly the first series of such metals, i.e. titanium, vanadium, chromium, manganese, nickel, and especially iron, cobalt, and copper. Suitable salt-forming, non-drying acids are mineral acids, especially hydrochloric, hydrobromic, nitric, sulphuric, phosphorous, and phosphoric acids, and organic acids such as chloroacetic, fumaric, maleic, oxalic, salicyclic, and more especially citric acid. Suitable chelating agents include those in which the chelating atoms are oxygen and/or nitrogen, for example, 1,2- and 1,3-diketones such as acetylacetone, alkylenediamines such as ethylenediamine, and more particularly ethylenediaminetetracetic acid.

The amount of catalyst employed preferably lies in the range 0.001 to 10% based on the weight of the fabric.

The term "fabric" as used throughout this specification covers garments, garment pieces, piece goods or other fabric items which require a milling and shrink-resistant treatment. Generally speaking knitted goods will be in garment form and woven goods in the piece. The term keratinous fibres used throughout this specification refers to fibres which ma ybe derived from alpaca, cashmere, mohair, vicuna, guanaco, camel hair, and llama but preferably are fibres derived from sheep's wool. The keratinous fibres may also be blended with other fibrous or filamentary material, e.g. polyamides, polyesters, polyacrylonitriles, silk, cotton, and regenerated cellulose. It has been found that the process is particularly applicable to the milling and shrink-resistant treatment of Shetland and lambswool knitted garments.

Before treatment according to the process of the present invention the fabric is preferably subjected to a conventional scouring step to remove contaminants, e.g. oil, from the fabric. Where the process of the invention is carried out in a dry-cleaning machine the scouring may be performed as a pretreatment in the same machine and in these circumstances it is unnecessary to dry the scoured fabric before carrying out the process of milling and imparting shrink-resistance.

The process of the present invention will now be described in greater detail with reference to the following examples. Unless otherwise specified, parts are by weight.

The wash tests employed are as follows:

(1) MILD MACHINE WASH

The samples are washed in a 50 litre International Cubex Shrinkage Testing Machine using a liquor:goods ratio of 25:1 with a 1 kg. load for 30 minutes. The wash liquor is a 1.25% buffer solution at pH 7 and 40° C.

(2) FULL MACHINE WASH

The samples are washed in the same machine using the same wash liquor but with a liquor:goods ratio of 15:1 with a 1 kg. load and for 1 hour.

The degree of milled finish is indicated thus:

Excellent—Excellent, soft, lofty finish.
Good—Reasonably soft handle with medium loft.
Fair—Adequate handle but lower degree of face.

Materials that were used in the examples are as follows:

Thiol Resin A

A mixture of 800 g. (0.2 g.-mol.) of a triol of average molecular weight 4,000 made from glycerol and propylene oxide, 55.2 g. (0.6 g.-mol.) of thioglycollic acid, 5 g. of toluene-p-sulphonic acid, and 350 ml. of toluene was heated to reflux with stirring in an atmosphere of nitrogen. Water (10.8 ml., 0.6 g.-mol.) formed during the reaction was removed as its azeotrope with toluene. The mixture was cooled and washed with water, and the organic layer was separated. On removal under vacuum of the solvent from the organic layer there remained 793 g. (94% of the theoretical yield) of the desired tris(thioglycollate) (Thiol Resin A), having a mercaptan content of 0.59 equiv./kg.

Thiol Resins B–G

These polymercaptans were prepared as described for Thiol Resin A except that in the case of resins E–G perchloroethylene was used instead of toluene and for resins B–D the reaction mixture was not washed with water: any unreacted acid was removed, together with the remaining toluene, by stripping the product under vacuum in a rotary evaporator.

| Polythiol | Average molecular weight | Polyol adduct Prepared from— Alkylene oxide | Alcohol | Esterifying acid |
|---|---|---|---|---|
| B | 3,000 | PO | Glycerol | Thioglycollic. |
| C | 5,000 | PO with EO tip | do | Do. |
| D | 1,000 | PO | do | Do. |
| E | 700 | PO | do | Do. |
| F | 1,500 | PO | Hexane-1, 2, 6 triol | Do. |
| G | 4,000 | PO | Glycerol | 2-Mercapto propionic. |

NOTE.—PO=Propylene oxide; EO=Ethylene oxide.

Thiol Resin H

Denotes "Thiokol LP-3" which, according to the manufacturers, Thiokol Chemical Corporation, had an average molecular weight of 1,000, a viscosity at 27° C. of 700—1200 centipoises and 2% cross-linking. The structure is substantially that represented by the formula $$HS(C_2H_4OCH_2OC_2H_4SS)_6C_2H_4OCH_2OC_2H_4SH$$

Thiol Resin J

A mixture of 23 g. of glycerol (0.25 g.-mol.), 425 g. of a polyoxypropylene glycol of average molecular weight 425 (1.0 g.-mol.), 146 g. of adipic acid (1.0 g.-mol.), 69 g. of thioglycollic acid (0.75 g.-mol.), 5 g. of toluene-p-sulphonic acid, and perchloroethylene (300 ml.) was heated to reflux with stirring for 5 hours under nitrogen. Water (48 ml.) formed during the reaction was removed as its azeotrope. The mixture was washed with water until the washings had pH 5–6, then the solvent was removed by distillation in vacuo. The residue (Thiol Resin J) had a thiol value of 1.10 equiv./kg. (calculated value, 1.22 equiv./kg.).

Epoxide Resin I

This denotes a polyglycidyl ether of 2,2'-bis(p-hydroxyphenyl)propane having an epoxide content of 5.2 equiv./kg.

Poly(aminoamide) Resin I

Denotes a poly(aminoamide) made from diethylenetriamine and a mixture of dimerised and trimerised unsaturated monocarboxylic acids, having an amine value equivalent of 350–400 mg. KOH/g.

Poly(aminoamide) Resin II

Denotes a similar product having an amine value equivalent of 210–230 mg. KOH/g.

Melamine Resin I

Is a n-butylated melamine-formaldehyde resin of 63–67% solids content in n-butanol supplied by BP Chemicals (U.K.) Ltd., London, under the designation "Epok U 9193."

Acrylic Resin I

Denotes a cross-linkable acrylic resin containing hydroxyl groups supplied at 54–56% solids content under the designation "Epok D 2100" by BP Chemicals (U.K.) Ltd., London.

Acrylic Resin II

Is a solvent-polymerised viscous acrylic ester polymer of 40% active content in methanol-ethyl acetate.

Catalyst MS

Contains 10% active substance in methanol-ethyl acetate.

Carboxylated Polybutadiene I

Was prepared from a polybutadiene supplied by the International Synthetic Rubber Co. Ltd., Southampton ("Intene 35S," 375 g.) in hexane (3375 g.) by reacting with thioglycollic acid (37.5) at 60° C. for 24 hours in presence of 0.3% azobis(isobutyronitrile). Analysis of the purified polymer showed a sulphur content of 1.75%, which is equivalent to 3% of the double bonds in the polybutadiene molecule having been carboxylated.

Silicone Resin I

Is a dimethyl silicone obtained from Midland Silicones Ltd., Reading, as "MS 200."

EXAMPLES 1–5

These examples illustrate the application of the invention in producing woollen garments with a soft milled finish and excellent shrink-resistance in a one-bath treatment in a dry-cleaning machine or solvent-scouring and milling machine.

Lambswool and Shetland knitted samples (500 g.) were solvent-scoured in perchloroethylene in a dry-cleaning machine, and were centrifugally extracted. The goods were tumbled in an emulsion of water and catalyst in a solution of resin and milling aid in perchloroethylene until all the water and catalyst had been exhausted on to the goods. The formulation of the milling bath was as follows:

Perchloroethylene—5 litres
Milling Agent KFS (Allied Colloids)—75 g.
Thiol Resin A—320 g.
Catalyst (see below)—4% on weight of wool
Water—25% on weight of wool The liquor was then allowed to drain back to the milling tank and the samples extracted to leave a proportion of the solution on the goods. After being tumbled to bring up the milled finish, the goods were dried off to leave the resin on the surface of the fibres.

The following time cycle was used:

Solvent scour—3 mins.
Extract—2 mins.
Mill—12 mins.
Extract—15 secs.
Cold Tumble—5 mins.
Dry at 70° C.—10 mins.
Cold Tumble—2 mins.

In all cases a good soft milled finish was obtained.

The following are the results of Full Machine Wash tests:

| Catalyst | Percent resin applied (on weight of wool) | Percent area felting shrinkage |
|---|---|---|
| Shetland Wool | | |
| Example: | | |
| 1 ........... DETA | 3.1 | 10 |
| 2 ........... PEI | 3.1 | 3 |
| 3 ........... MEA | 3.2 | 10 |
| Control | 0.0 | 51 |
| Lambswool | | |
| 4 ........... DETA | 2.8 | 12 |
| 5 ........... MEA | 3.0 | 5 |
| Control | 0.0 | 61 |

EXAMPLES 6–9

These examples demonstrate that woollen woven pieces and blends of wool with non-woollen textile fibres may be milled in a similar way to woollen knitted fabrics.

200 g. fabric was solvent-scoured for 4 mins. and then extracted for 2 mins. The samples were then milled in an emulsion containing:

Catalyst—4 g. DETA (2% on weight of fabric)
Water—36 ml. (18% on weight of fabric)
Perchloroethylene—2 litres
Milling Agent KFS—6 g.
Thiol Resin A—163 g.

After being milled, the goods were extracted to 65% retention and then tumbled for 5 mins. They were then dried at 70° C. A pleasantly milled finish was obtained and the fabric had good shrink-resistance.

The fabrics treated in this way were as follows:

Example 6: Woollen woven piece; 420 g./sq. m.
Example 7: 50:50 vicose/wool blend; 422 g./sq. m.
Example 8: Knitted lambswool sweater; 1/13's, cover factor (CF) 1.05
Example 9: Knitted Shetland sweater; 2/10's, CF 0.90

WASH TEST RESULTS

| Example | Percent resin applied (on the weight of fabric) | Percent area felting shrinkage | |
|---|---|---|---|
| | | Mild wash | Full wash |
| 6 | 3.4 | 0 | 1 |
| Control | 0.0 | 3 | 23 |
| 7 | 3.4 | 1 | 4 |
| Control | 0.0 | 2 | 19 |
| 8 | 2.7 | 1 | 3 |
| Control | 0.0 | 24 | 61 |
| 9 | 3.0 | 0 | 0 |
| Control | 0.0 | 20 | 55 |

EXAMPLES 10–17

These examples demonstrate that a variety of thiol resins may be used in the process of this invention to impart shrink-resistant properties to wool fabrics.

Lambswool samples were treated as in Examples 6–9 except that the thiol resins were of different chemical structures, molecular weights and thiol contents. 3% of resin (on the weight of wool) was applied in each case.

The resins employed, and the results of wash tests, are given in the following table.

| Example | Resin | Thiol content (equiv. per kg.) | Functionality | Mol weight | Milled finish | Percent area felting shrinkage | |
|---|---|---|---|---|---|---|---|
| | | | | | | Mild wash | Full wash |
| 10 | Thiol Resin B | 0.77 | 3 | 3,200 | Good | 2 | 3 |
| 11 | Thiol Resin C | 0.46 | 3 | 5,200 | do | 5 | 18 |
| 12 | Thiol Resin D | 2.36 | 3 | 1,200 | do | 2 | 12 |
| 13 | Thiol Resin E | 3.22 | 3 | 900 | do | 3 | 7 |
| 14 | Thiol Resin F | 1.63 | 3 | 1,700 | do | 3 | 18 |
| 15 | Thiol Resin G | 0.60 | 3 | 4,250 | do | 3 | |
| 16 | Thiol Resin H | 1.72 | 2 | 1,000 | Fair | 19 | |
| 17 | Thiol Resin J | | 3 | | Good | 9 | |
| Control | | | | | | 24 | 61 |

EXAMPLES 18–20

These examples demonstrate that resins other than the thiol resins described above can be used in the milling bath.

The resins employed are solvent-soluble resins which have essentially little reactivity with the milling water and are applied in the milling bath in a similar way to Examples 10–17 except that no catalyst is contained in the milling water.

| Example | Resin | Catalyst in solvent (percent on weight of resin) |
|---|---|---|
| 18 | Acrylic Resin II | |
| 19 | Carboxylated Polybutadiene I | |
| 20 | Silicone Resin I | Bis(2,4-dichlorobenzoyl) peroxide. |

| | Percent resin applied (on the weight of wool) | Milled finish | Percent area felting shrinkage | |
|---|---|---|---|---|
| | | | Mild wash | Full wash |
| Example | | | | |
| 18 | 3.5 | Fair | 10 | 44 |
| 19 | 3.25 | Good | 5 | 22 |
| 20 | 3.5 | Excellent | 9 | 44 |
| Control | 0.0 | | 24 | 61 |

EXAMPLES 21–24

These examples demonstrate that mixtures of resins may be used to give a shrink-resistant finish in accordance with this invention. The experimental procedure was as in Examples 18–20.

Examples

21—Acrylic Resin I and Melamine Resin I at a ratio of 70:30.
22—Epoxide Resin I and Poly(aminoamide) I in a 50:50 ratio.
23—As 22 but at a ratio of 25:75.
24—As 23 but using Poly(aminoamide) Resin II.

Results

| | Percent total resin (on the weight of wool) | Milled finish | Percent area felting shrinkage | |
|---|---|---|---|---|
| | | | Mild wash | Full wash |
| Example: | | | | |
| 21 | 3.50 | Fair | 8 | 34 |
| 22 | 3.25 | do | 1 | 3 |
| 23 | 3.25 | do | 0 | 2 |
| 24 | 3.61 | do | 0 | 2 |
| Control | 0.0 | | 21 | 61 |

EXAMPLES 25–35

These examples illustrate the different solvent-soluble emulsifiers (milling aids) which may be used in the milling bath to give a stable emulsion of water in the solution.

It was also possible to obtain a reasonably stable emulsion with many thiol resins without any milling aid but the presence of a milling aid made it more stable.

Anionic, cationic, and nonionic milling aids were investigated. The procedure was as in Examples 6–9 with Thiol Resin A on lambswool CF 1.05 using 2% DETA (on the weight of fabric) as catalyst.

| | Milling aid | Type | Conc. in solvent (g./litre) | Milled finish | Percent area felting shrinkage | |
|---|---|---|---|---|---|---|
| | | | | | Mild wash | Full wash |
| Example: | | | | | | |
| 25 | None | | | Excellent | 0 | 5 |
| 26 | Milling Agent KFS (Allied Colloids Ltd.) | Cationic emulsifier | 3 | do | 0 | 5 |
| 27 | do | do | 10 | do | 0 | 4 |
| 28 | Tembo AV (Bayer) | Anionic emulsifier | 3 | Good | 8 | 16 |
| 29 | do | do | 10 | do | 4 | 22 |
| 30 | Solusoft WJ (Hoechst) | Nonionic emulsifier | 3 | do | 3 | |
| 31 | do | do | 10 | do | 1 | |
| 32 | Avivan WB (Pfersee) | Anionic emulsifier | 3 | do | 6 | |
| 33 | do | do | 10 | do | 2 | |
| 34 | Imerol DCAL (Sandoz) | Solvent soluble soap | 3 | do | 2 | |
| 35 | do | do | 10 | do | 8 | |
| Control | | | | | 24 | 61 |

EXAMPLES 36–49

These examples demonstrate that various water-soluble catalysts, including amines, alkalies, polyamines, thiocarbamates, and peroxides, can be applied in the milling water as a means of accelerating the cure of the resin and obtaining a more effective shrink-resistant treatment.

Some effect is observed without any catalyst since the resin slowly cures in air but better results are obtained when a catalyst is incorporated.

The procedure was as described in Examples 6–9 using lambswool CF 1.05 with 3% resin (on the weight of wool).

| | Catalyst (percent on weight of wool) | Milled finish | Percent area felting shrinkage | |
|---|---|---|---|---|
| | | | Mild wash | Full wash |
| Example: | | | | |
| 36 | None | Excellent | 10 | 45 |
| 37 | 1% DETA | do | 1 | 15 |
| 38 | 1% HMD | do | 1 | 5 |
| 39 | 1% PEI | Good | 3 | 22 |
| 40 | 1% MEA | Excellent | 0 | 4 |
| 41 | 2% MEA/2% monoethanolamine sesquisulphite | Good | 0 | 7 |
| 42 | 1% NaHCO$_3$ | do | 2 | 10 |
| 43 | 1% Na$_2$CO$_3$ | do | 1 | 7 |
| 44 | 1% borax | do | | 18 |
| 45 | 1% Na diethyldithiocarbamate | Fair | | 26 |
| 46 | 2% Na diethyldithiocarbamate | do | | 10 |
| 47 | 2% NaOH | do | 13 | |
| 48 | 5% ammonia | Good | 13 | |
| 49 | 1% ammonium persulphate | do | 7 | |
| Control | No resin | do | 24 | 61 |

EXAMPLES 50–52

The following examples demonstrate the application of catalyst dissolved with the resin in the organic solvent.

Such catalysts include siccatives and organic peroxides. These examples are conducted as Examples 6–9 but the water is milled onto the goods and the catalyst applied with the resin from the solvent phase. 3% resin (on the weight of wool) was used.

| | | | Percent area felting shrinkage | |
|---|---|---|---|---|
| | Catalyst (percent on weight of wool) | Milled finish | Mild wash | Full wash |
| Example: | | | | |
| 50 | 1% Ca naphthenate | Fair | 8 | 39 |
| 51 | 1% Cu naphthenate | do | 10 | 31 |
| 52 | 1% cumene hydroperoxide | Good | 10 | 43 |
| Control | No resin | | 24 | 61 |

We claim:

1. A process for milling a textile fabric consisting at least partially of keratinous fibres and simultaneously treating it with a resin imparting shrink-resistance, comprising the steps of
 (a) agitating the fabric in a milling liquor which is an organic liquid containing
  (i) a resin which imparts shrink-resistance dissolved therein;
  (ii) water emulsified therein;
 (b) separating excess liquor from the fabric; and
 (c) curing the resin constitutent of the liquor remaining on the fabric.

2. A process according to claim 1 in which the resin is insoluble in water.

3. A process according to claim 2 which includes cross-linking said resin with a chemical species selected from reactive centres on the keratinous fibres, a co-reactant or said resin itself.

4. A process according to claim 1 in which said resin is selected from the group consisting of polythiol, polyepoxide, acrylic, polybutadiene, carboxylated polybutadiene and silicone resins.

5. A process according to claim 1 in which said resin is a thiol resin having at least two thiol groups per molecule and containing:
 (a) a radical of a polyhydric alcohol;
 (b) bound to this radical, at least two poly(oxyalkylene) chains; and
 (c) bound through oxygen atoms to carbon in the said poly(oxyalkylene) chains, at least two residues selected from the group consisting of an acyl radical of a thiol-containing aliphatic carboxylic acid or a residue, after removal of a hydroxyl group, of a thiol-containing aliphatic alcohol.

6. A process according to claim 1 in which the amount of said resin applied to the fabric is from 0.5 to 15% by weight.

7. A process according to claim 1 in which the catalyst for said resin is contained in the milling liquor.

8. A process according to claim 1 in which a catalyst is dissolved in the aqueous phase of said milling liquor and in an amount corresponding to 0.001 to 10% by weight of the fabric.

9. A process according to claim 1 in which a catalyst is dissolved in the organic phase of said milling liquor in an amount corresponding to 0.001 to 10% by weight of the fabric.

10. A process according to claim 1 in which said fabric after separation of excess liquor is heated to a temperature in the range of 25–150° C.

11. A process according to claim 1 in which said milling liquor contains a surface active emulsifying agent in a concentration of from 1 to 30 grams per litre.

12. A process according to claim 1 in which said milling liquor contains 2 to 30% by weight of water on the dry weight of the fabric.

13. A process according to claim 1 in which said organic liquid is a dry-cleaning solvent.

14. A process according to claim 1 in which the excess milling liquor is drained from said fabric to leave 10 to 500% of liquor thereon based on the weight of the fabric.

References Cited

UNITED STATES PATENTS

| 3,423,166 | 1/1969 | Peters | 8—128 |
| 3,477,804 | 11/1969 | Friedl | 8—128 |
| 3,033,706 | 5/1962 | Pardo | 117—55 |

FOREIGN PATENTS

| 594,901 | 1945 | Great Britain | 8—112 |

GEORGE F. LESMES, Primary Examiner

J. P. BRAMMER, Assistant Examiner

U.S. Cl. X.R.

8—112, 127.6, 128; 26—19; 28—72.3